(12) United States Patent
Whittington et al.

(10) Patent No.: US 9,311,064 B1
(45) Date of Patent: *Apr. 12, 2016

(54) SYSTEMS AND METHODS FOR AUTOMATED CENTRALIZED BUILD/MERGE MANAGEMENT

(71) Applicant: United Services Automobile Association (USAA), San Antonio, TX (US)

(72) Inventors: Paula Whittington, Helotes, TX (US); Sean M. Hager, Boerne, TX (US); Carlos J. Chavez, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,179

(22) Filed: Aug. 22, 2013

Related U.S. Application Data (63) Continuation of application No. 11/524,359, filed on Sep. 19, 2006, now Pat. No. 8,522,207.

(51) Int. Cl.
    G06F 9/44    (2006.01)
    G06F 9/45    (2006.01)
(52) U.S. Cl.
    CPC .................................... *G06F 8/433* (2013.01)
(58) Field of Classification Search
    USPC ........................................................ 717/122
    See application file for complete search history.

(56) References Cited

U.S. PATENT DOCUMENTS

| | | | |
|---|---|---|---|
| 4,809,170 A | 2/1989 | Leblang et al. | |
| 5,649,200 A * | 7/1997 | Leblang et al. | 717/122 |
| 5,659,735 A | 8/1997 | Parrish et al. | |
| 5,675,802 A | 10/1997 | Allen et al. | |
| 5,805,889 A | 9/1998 | Van De Vanter | |
| 5,854,932 A | 12/1998 | Mariani et al. | |
| 5,878,432 A | 3/1999 | Misheski et al. | |
| 5,903,897 A | 5/1999 | Carrier et al. | |
| 5,960,196 A * | 9/1999 | Carrier et al. | 717/122 |
| 6,112,024 A | 8/2000 | Almond et al. | |
| 6,223,343 B1 | 4/2001 | Hopwood et al. | |
| 6,385,768 B1 | 5/2002 | Ziebell | |
| 6,993,759 B2 | 1/2006 | Aptus et al. | |
| 7,133,894 B2 * | 11/2006 | Banerjee et al. | 709/203 |
| 7,346,904 B2 * | 3/2008 | Fisher et al. | 717/177 |
| 7,603,393 B1 | 10/2009 | Cote et al. | |
| 7,634,758 B2 | 12/2009 | Bhatia | |
| 7,827,543 B1 * | 11/2010 | Kosche et al. | 717/158 |

(Continued)

OTHER PUBLICATIONS

Whali, et al. "Software Configuration Management a Clear Case for IBM Rational ClearCase and ClearQuest UCM", Dec. 2004, retrieved from <http://www.redbooks.ibm.com/redbooks/pdfs/sg246399.pdf>, 398 pages.

(Continued)

*Primary Examiner* — Marina Lee
(74) *Attorney, Agent, or Firm* — Joseph A. Fuchs; Nixon Peabody LLP (57) ABSTRACT

Embodiments of the invention monitor requests for a source code build of a program. The source code build is generated using the most recent applicable release of the dependencies. The source code build is dynamically merged into at least one subsequent release. Other embodiments may be described and claimed.

6 Claims, 8 Drawing Sheets

(56) References Cited

U.S. PATENT DOCUMENTS

| | | | |
|---|---|---|---|
| 8,078,589 B2 | 12/2011 | Cote et al. | |
| 8,522,207 B1 * | 8/2013 | Whittington et al. | 717/122 |
| 2003/0182652 A1 | 9/2003 | Custodio | |
| 2004/0019888 A1 | 1/2004 | Jain et al. | |
| 2004/0060035 A1 | 3/2004 | Ustaris | |
| 2004/0123268 A1 | 6/2004 | Lundberg et al. | |
| 2004/0143830 A1 | 7/2004 | Gupton et al. | |
| 2004/0230886 A1 * | 11/2004 | Livshits | 715/500 |
| 2004/0249934 A1 | 12/2004 | Anderson et al. | |
| 2004/0255291 A1 | 12/2004 | Sierer et al. | |
| 2007/0016887 A1 | 1/2007 | Kaler et al. | |
| 2007/0101256 A1 * | 5/2007 | Simonyi | 715/511 |
| 2007/0157192 A1 * | 7/2007 | Hoefler et al. | 717/168 |
| 2009/0300580 A1 | 12/2009 | Heyhoe et al. | |

OTHER PUBLICATIONS

Duvall, Paul "Automation for the people: Choosing a Continuous Integration server", Sep. 5, 2006. Retrieved from <http://www.ibm.com/developerworks/java/library/j-ap09056/>, 10 pages.

"Anthill Pro", online. Retrieved from the Internet <URL: http://www.urbancode.com/products/anthillpro/defaultjsp>, Accessed: Jul. 29, 2006. 3 pgs.

"Continuous Integration", online. Retrieved from the Internet: <URL: http://en.wikipedia.org/wiki/Continuous_integration>. Accessed: Jul. 29, 2006. 2 pgs.

"Cruise Control", online. Retrieved from the Internet: <URL: http://cruisecontrol.sourceforge.net/>, Accessed: Jul. 29, 2006. 1 pg.

Fowler, M. "Continuous Integration", online. Retrieved from the Internet: <URL: http://www.martinfowler.com/articles/continuousIntegration.html>, May 1, 2006, 14 pgs.

Minard, J. "STRecon—StarTeam Branch Reconciliation Report Tool v1.08", online. Retrieved from the Internet: <URL: http://cc.borland.com/Item.aspx?id=21267>, Jan. 15, 2004, 3 pgs.

Zawadzki, M. "Beyond Continuous Integration, A Holistic Approach to Build Management (Part 1 of 2)", online. Retrieved from the Internet: <URL: http://www.cmcrossroads.com/component/option.com_magazine/func,show_article/id,208/Itemid,120/>, Oct. 1, 2003. 3 pgs.

* cited by examiner

SYSTEMS AND METHODS FOR AUTOMATED CENTRALIZED BUILD/MERGE MANAGEMENT

CROSS REFERENCES

This application is a continuation of U.S. patent application Ser. No. 11/524,359, filed Sep. 19, 2006, now U.S. Pat. No. 8,522,207, and is related to U.S. patent application Ser. No. 11/524,360, filed Sep. 19, 2006; and U.S. patent application Ser. No. 11/524,358.

TECHNICAL FIELD

Various embodiments described herein relate to computer systems generally, including systems and methods for automated centralized build/merge management.

BACKGROUND

New or modified functionality for enterprise level software may be released on a weekly basis. Developers work on many different weekly releases in parallel. Once code is moved into production, it is manually merge code from week to week meaning developers have to resolve conflicts on each manual merge effort. Developers may spend as much as 10-20% of their time resolving merge conflicts.

SUMMARY

Example systems and methods monitor requests for a source code build of a program. The source code build is generated using the most recent applicable release of the dependencies. The source code build is dynamically merged into at least one subsequent release. Other embodiments may be described and claimed

DETAILED DESCRIPTION

The following detailed description is divided into four sections. The first section presents a system overview of the inventive subject matter. The second section provides methods of using example embodiments of the inventive subject matter. The third section describes example implementations. The fourth section describes the hardware and the operating environment in conjunction with which embodiments can be practiced.

System Level Overview

Figure 1:
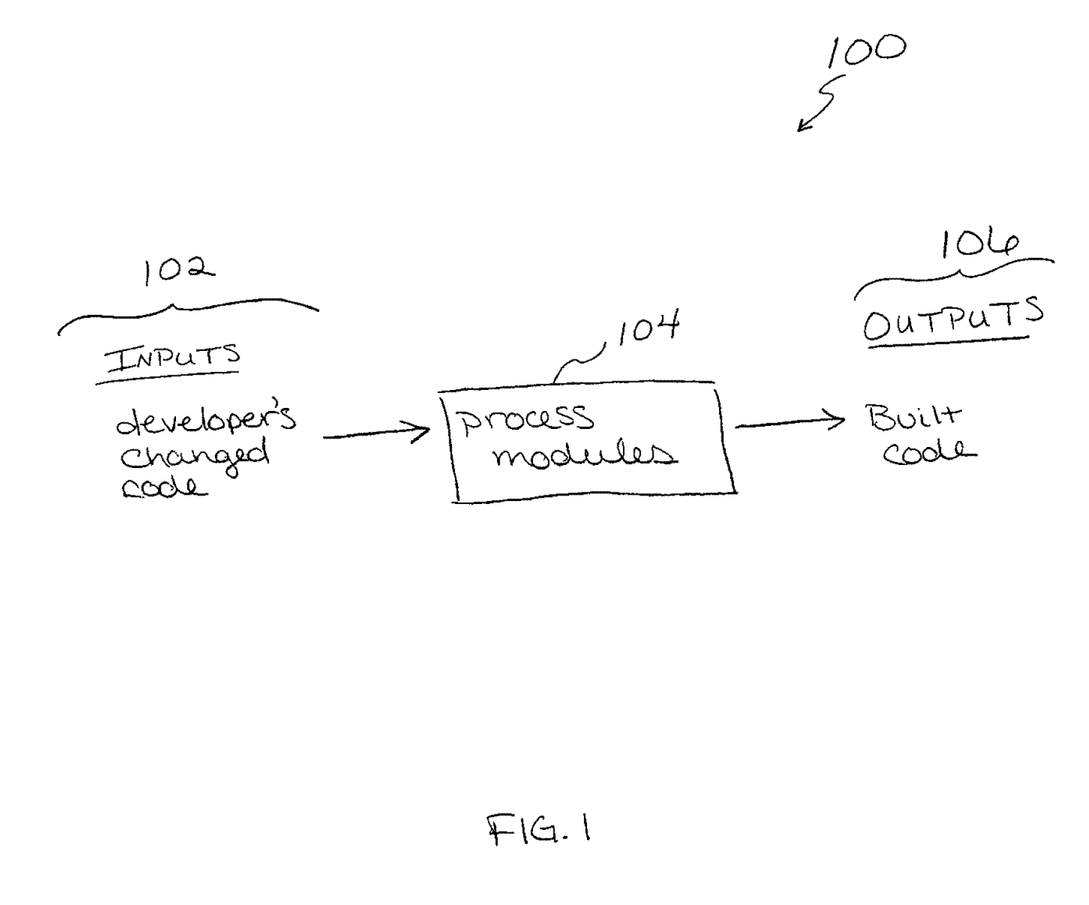
FIG. 1 is a block diagram of an automated centralized build/merge management system according to various embodiments.

FIG. 1 is a block diagram of an automated centralized build/merge management system 10d according to various embodiments. The system 100 comprises inputs 102, processing modules 104, and outputs 106.

The inputs 102 include programming code (also referred to as "code"). In some embodiments, the programming code may be received from an individual developer or from members of a software development team. In other embodiments, the programming code may also be retrieved from one or more data storage devices such as a source code repository.

The processing modules 104 perform the functions of a novel automated, centralized build/merge management system. The processing modules 104 allow developer triggered, on-demand, building of code and merging of code into future releases. Generally, processing modules include routines, programs, objects, components, data structures, etc., that perform particular functions or implement particular abstract data types. As used herein, a "build" refers to a version of a program. In some embodiments, a build is a pre-production version and as such is identified by a build number, rather than by a production number. Repeated builds are a part of the development process. Also as used herein, "merging" of code refers to a process of identifying code that has been changed in one release and copying it down to one or more subsequent releases. The automated, centralized build/merge management system may interact with other software development systems including, but not limited to, a source code repository and/or a build tool.

The outputs 106 comprise built code that is tested for the next release. Embodiments of the automated, centralized build/merge management system 100 eliminate the need for system developers to have to wait for a manual merge of code.

Figure 2:
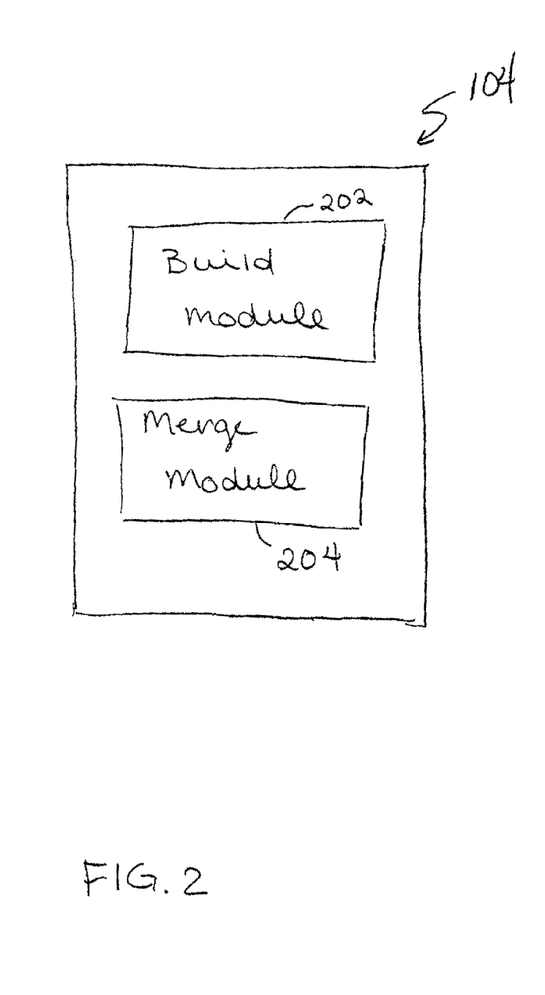
FIG. 2 is a block diagram of the processing modules of the system shown in FIG. 1 according to various embodiments.

FIG. 2 is a block diagram of the processing modules 104 of the system shown in FIG. 1 according to various embodiments. In one embodiment, the processing modules 104 comprise a build module 202 and a merge module 204.

The build module 202 enables automated builds to be initiated by developers based on a trigger. The build module 202 also provides the ability to build against the most current release of a dependency that applies to what is being built.

The merge module 204 also enables automated merges to be triggered by developers. As a result the developer does not have to wait for a manual merge of the code. Rather, the developer can set triggers to merge the code down through subsequent releases. The automated builds and automated merges provide a useful, concrete and tangible result and are described in more detail in the following method section.

Methods

In this section, particular methods of example embodiments are described by reference to a series of flow charts. The methods to be performed constitute computer programs made up of computer-executable instructions.

Figure 3:
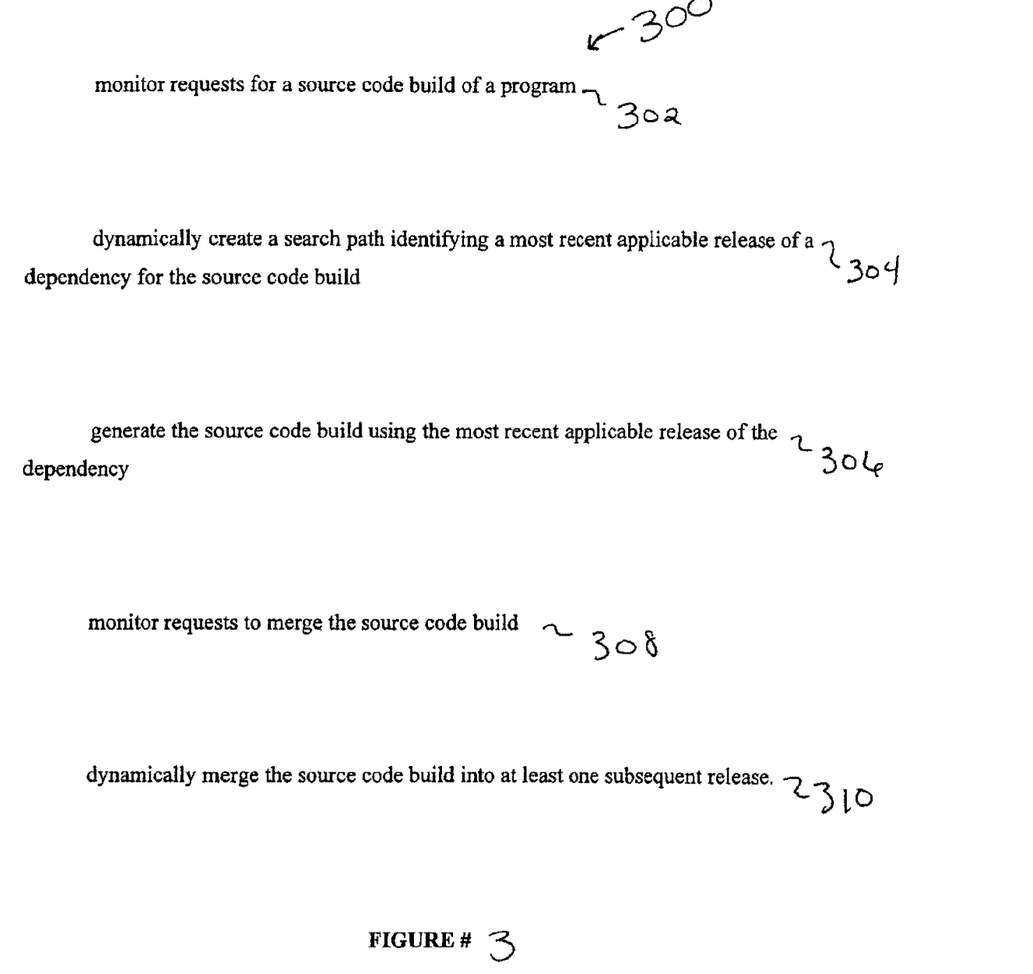
FIG. 3 is a flow diagram illustrating a method of building and merging code according to various embodiments.

FIG. 3 is a flow diagram illustrating a method of building and merging code according to various embodiments. As shown in FIG. 3, requests for a source code build of a program are monitored (block 302). In one embodiment, the requests are monitored with a daemon referred to herein as a "Continuous Integration Daemon" or "CID". Embodiments of the invention are not limited to use of a daemon and may be any program that runs continuously or periodically to monitor a system for requests to build or merge code. After receiving a request for a source code build, a search path is dynamically created identifying a most recent applicable release of a dependency for the source code build (block 304). Then the source code build is generated using the most recent applicable release of the dependency (block 306). After the source code build is complete, the daemon monitors requests to merge the source code build (block 308). In an alternate embodiment, daemon may receive another request for a source code build (block 310). In some embodiments, multiple builds are performed before a merge is requested and/or performed. After a request to merge the source is received, the source code build is dynamically merged into at least one subsequent release (block 312). Alternate embodiments include maintaining an inventory of source code builds.

In some embodiments, daemon also provides a notification after generating the source code build or after merging the source code build. In other embodiments, the request for a source code build or the request to merge the source code is represented by a trigger. As used herein, a "trigger" is anything that initiates an action such as building or merging code. For example, a trigger a label indicating the status of a particular project or segment of code. Example labels include, but are not limited to, Built, Merge Trigger, Build Trigger and so on.

Figure 4:
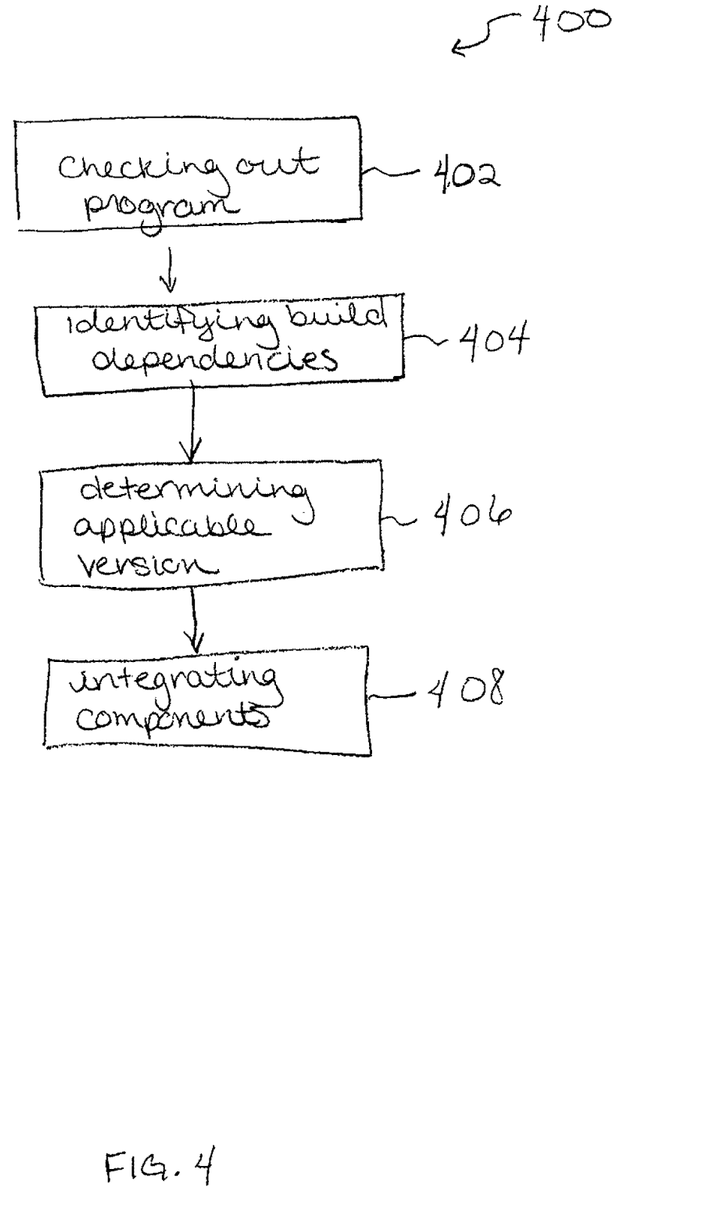
FIG. 4 is a flow diagram illustrating a method of building code according to various embodiments.

FIG. 4 is a flow diagram illustrating an alternate method of building code according to various embodiments. As shown in FIG. 4, a program is checked out of a centralized location (block 402). Then, build dependencies are identified for the program (block 404). An applicable version of the build dependency is identified (block 406). The build integrates additional components with the program using the applicable version of the build dependencies (block 408). As used herein, the "applicable version" refers to a most recent release of a build dependency that applies to the version of the program being built.

In alternate embodiments, the program is checked out of a source code repository after detection of a trigger. In another embodiment, a notification such as an email message is provided upon completion of the integrating additional components. In still other embodiments, the program is one version of a plurality of versions of the being worked on by the developer.

Figure 5:
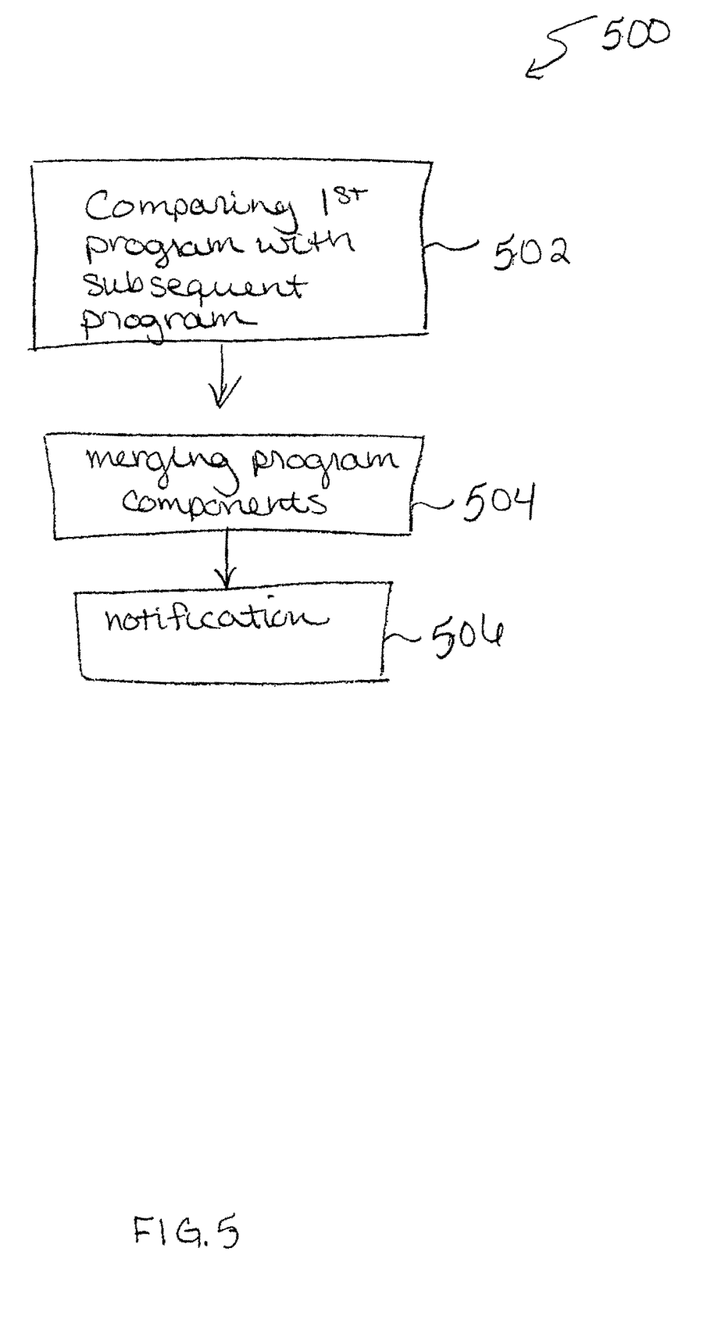
FIG. 5 is a flow diagram illustrating a method of merging code according to various embodiments.

FIG. 5 is a flow diagram illustrating a method of merging code according to various embodiments. As shown in FIG. 5, a first release of a program is compared with a subsequent release of the program (block 502). If there is a difference between the first release and the subsequent release, one or more components of the first release are merged with one or more components of the subsequent release (block 504). A notification is provided upon completion of merging the components (block 506).

In alternate embodiments, providing the notification comprises identifying a conflict if there is a difference between one of the components of the first release and a same one of the components of the subsequent release. In another embodiment, one of the components from the subsequent release is deleted, if that component is omitted in the first release. In still another embodiment, one of the components of the subsequent release is updated if the same component in the first release is updated. In yet another embodiment, one of the components of the first release is copied to the subsequent release, if the component of the first release is new to the subsequent release. A subsequent release may be an immediate next release in a sequence or a later release in the sequence.

It may be possible to execute the activities described herein in an order other than the order described. And, various activities described with respect to the methods identified herein can be executed in repetitive, serial, or parallel fashion.

Example Implementations

Figure 6:
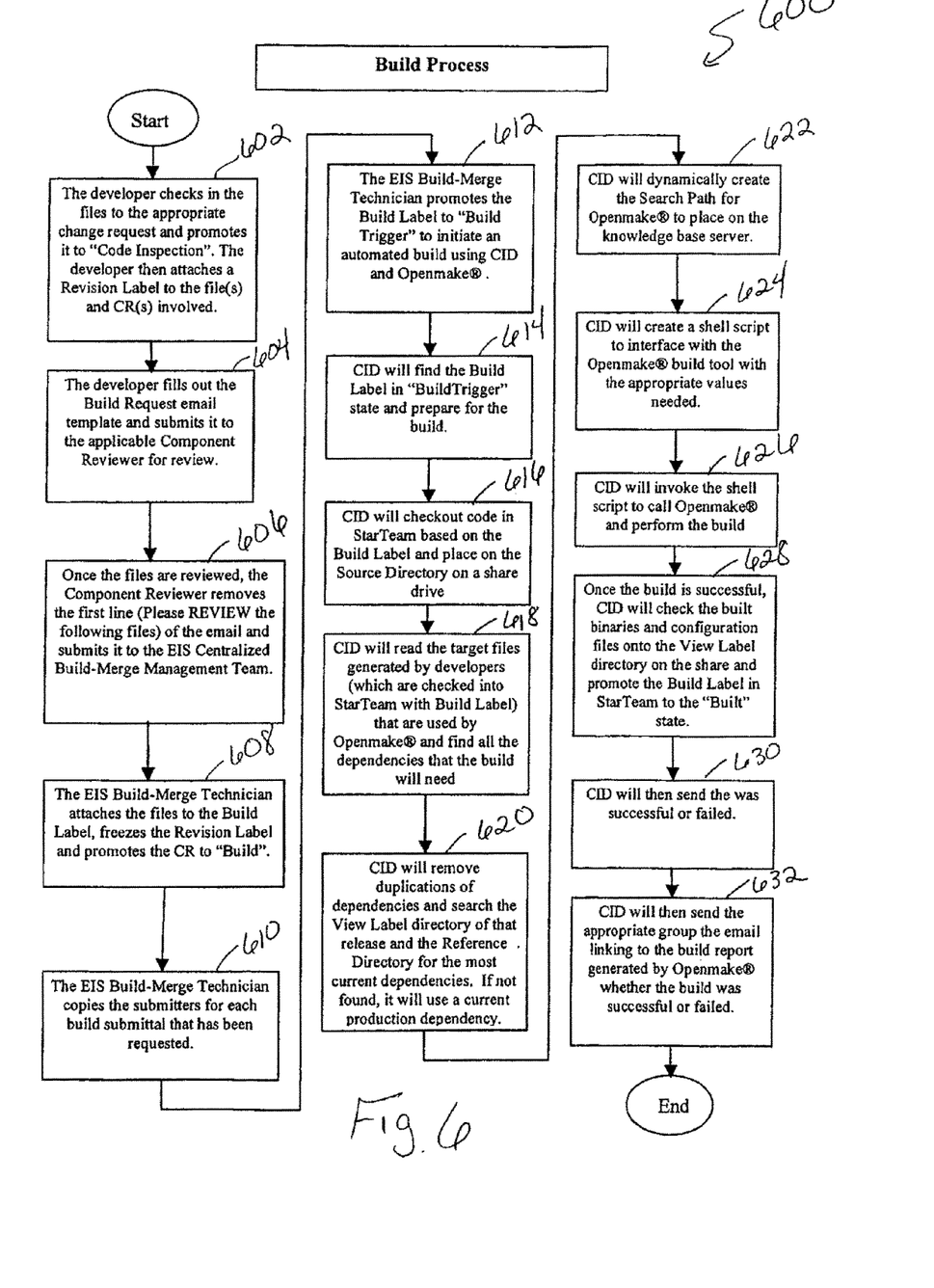
FIG. 6 is a more detailed flow diagram illustrating an alternate method of building code according to various embodiments.
Figure 7:
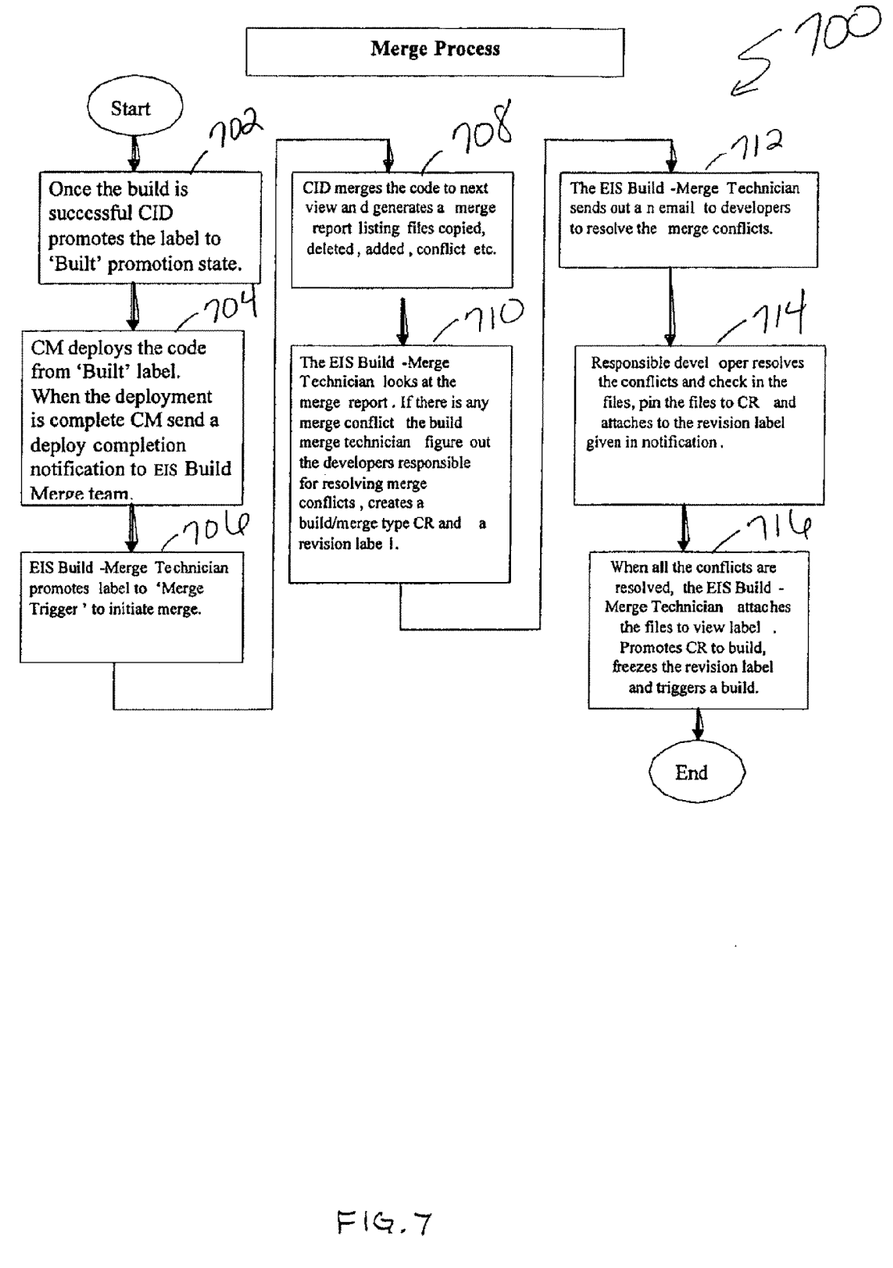
FIG. 7 is a more detailed flow diagram illustrating an alternate method of merging code according to various embodiments.

Various examples of systems and methods for embodiments of the invention have been described above. In this section FIGS. 6 and 7 illustrate more detailed examples of building code and merging code. Embodiments of the invention are not limited to these specific examples. Rather, these examples are provided for illustrative purposes only.

FIG. 6 is a more detailed flow diagram illustrating an alternate method 600 of building code according to various embodiments. The embodiment shown in FIG. 6 illustrates a workflow for a build process that may occur after a developer completes work on code and is ready to commit the code to a code repository for a build.

As shown in FIG. 6, a developer checks in the files and makes the appropriate change request to begin the process to request a build (block 602). In one embodiment, the developer submits a change request email message and submits the code to another member of the software development team referred to herein as the "component reviewer" (block 604). Once the files are reviewed by the component reviewer, the component reviewer submits the build request to another group in the software development team referred to herein as the "build-merge management team" (block 606). A member of the build-merge management team promotes the change request to "Build" (608) and also copies the developer(s) submitting the build request (610). The member of the build-merge management team also changes the build label to "Build Trigger" in order to trigger the novel automated build/merge management process (block 612).

In one embodiment, the automated build is performed using a continuous integration daemon (CID) and a commercial program called Openmake®. The CID searches for the label "Build Trigger" and prepares to perfoun the build for the code in the "Build Trigger" state (block 614). The CID checks out the code from the source code repository, such as the StarTeam source code repository (block 616). The CID reads the target files generated by the developers and identifies the dependencies that the build will need (block 618). The CID identifies the applicable version of the build dependency by searching the directory structure for the most current version of the dependencies. If no new versions are found, the CID will use the current production version of the dependency (block 620). The CID dynamically creates a Search Path for the build tool, such as Openmake® (block 622). The CID will Create a shell script to interface with the build tool (block 624). The CID invokes the shell script to call the build tool and perform the build (block 626). After the build has successfully completed, the CID checks the files in and changes the Build label to the "Built" state (block 628). CID then checks to determine if the build was successful or failed (block 630) and notifies the appropriate groups by email (block 632).

FIG. 7 is a more detailed flow diagram illustrating an alternate method 700 of merging code according to various embodiments. The method of building code described by reference to FIG. 6 may occur one or more times before the method of FIG. 7 is performed. In an alternate embodiment, the method of FIG. 7 may be performed without first performing the method of FIG. 6. As shown in FIG. 7, once the build is successful, the CID promotes the label to the "Built" state (block 702). The configuration manager deploys the code from the "Built" label (block 704). A member of the software development team changes the label to "Merge Trigger" to initiate the novel automated merge method according to embodiments of the invention (block 706). The CID merges the code and generates a merge report summarizing the files that were copied, deleted, added, identified as a conflict (block 708). A member of the software development team reviews the report (block 710) and works with the developers to resolve any conflicts (blocks 712 and 714). When the conflicts are resolved, a member of the software development team promotes the change request to build and triggers a build of the merged code (block 716).

Still other example embodiments centralize not only the merge process but also the build process by use of the Continuous Integration Daemon (CID). For example, an automated build system enables the CID to propagate changes from one weekly release to the next dependent weekly release of source code by use of the source code repository (e.g., StarTeam). Other example embodiments enable automated merges that are triggered by developers when ready based on promotion states within the source code repository. Embodiments enable quick merge results be sent via email to developers and the Configuration Management (CM) team.

Example embodiments also enable automated'builds to be triggered by developers based on the same promotion state model created for the merges. This will gain efficiencies by limiting the numbers of users/projects affected by merge or build problems, improving application build response times, stability and performance while providing consistent information across enterprise contact channels and platforms.

In one embodiment, the CID performs the following functions:
- Trigger automated source code builds based on a Promotion State in StarTeam
- Provide build results via e-mail to Software Configuration Management (SCM) and developers
- Provide a build inventory with time/date of the artifacts built (i.e. jar, war, ear, zip)
- Place built artifacts in a distributed repository based on a point in time and weekly release naming conventions
- Build one request at a time per StarTeam project
- Allow developers to execute a build manually without checking code into StarTeam (used for unit testing)
- Provide the ability to build without merging
- Provide an interface to automatically deploy built artifacts
- Provide a shared directory structure that gets updated with each build and merge so that other tools can plugin and make use of the information (i.e. WebSphere Application Developer (WSAD) plugin) to provide more automation for faster time to market.

Some example embodiments combine merging and building into one that is centralized through a shared directory and automated which provides faster time to market for developers and Software Configuration Management (SCM) which standardizes builds and merges with a process of ensuring that when source code is merged, it is tested and approved. Embodiments of the invention also determine the latest dependency needed to build source code to ensure each build gets the latest tested dependency changes.

Embodiments of the invention can easily be updated to plug into any available repository or build tool including, but not limited to StarTeam as the repository and Openmake© as tool actually performing the build.

Embodiments of the invention provide:
- Increases the repeatability of the overall process for merges and builds.
- Developers manage merges based on their work schedule.
- Production code is merged down to all views in order of Release Views.
- Developers manage builds when code is unit tested and ready for deployment.
- Removes manual process steps, allowing for quicker builds with quicker feedback which slow down more out of cycle builds and deploy further in the testing life cycle
- Builds are a form of validation; more frequent builds provide a means of caching problems sooner and solving them quicker.
- Free up CM personnel from daily manual tasks of merges and builds.
- Centralized log repository of builds allows developers and CM to view a history through a Web interface.

Hardware and Operating Environment

This section provides an overview of an example hardware and them operating environments in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 8 below.

Figure 8:
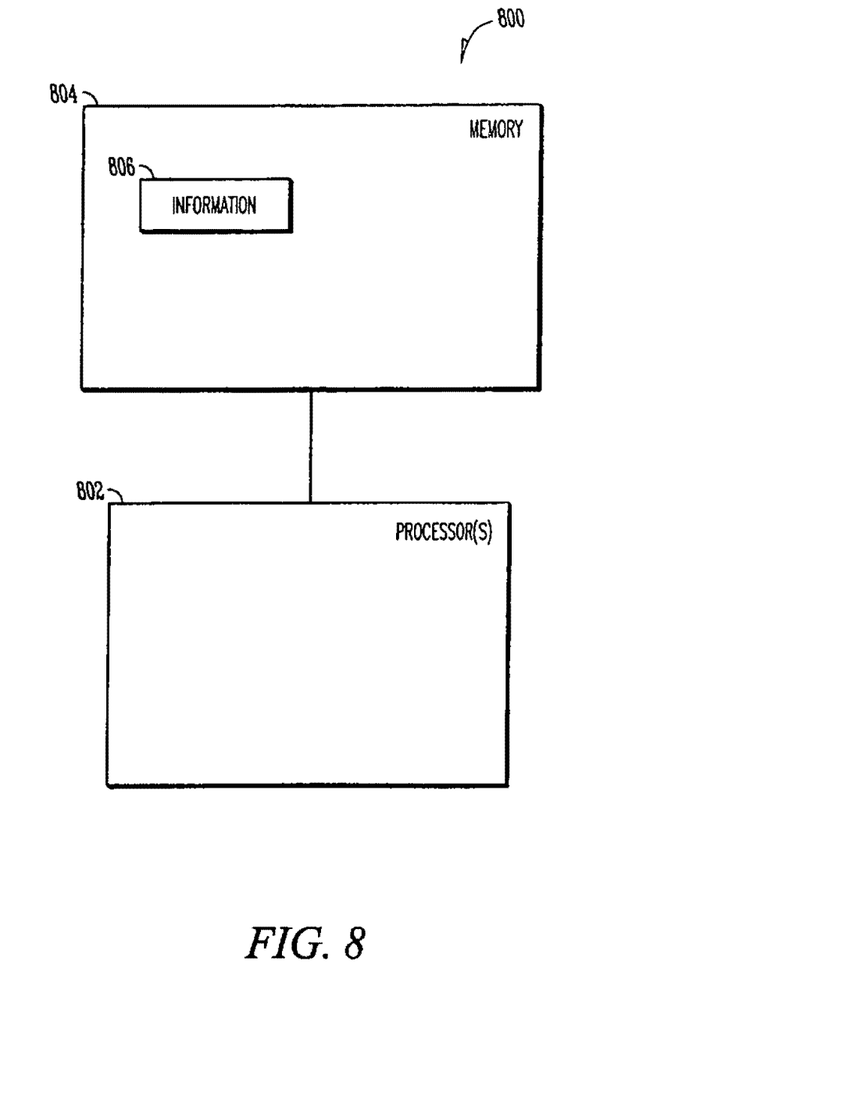
FIG. 8 is a block diagram of an article according to various embodiments of the invention.

FIG. 8 is a block diagram of an article 885 according to various embodiments of the invention. Such embodiments may comprise a computer, a memory system, a magnetic or optical disk, some other storage device, or any type of electronic device or system. The article 885 may include one or more processor(s) 887 coupled to a machine-accessible medium such as a memory 889 (e.g., a memory including electrical, optical, or electromagnetic elements). The medium may contain associated information 891 (e.g., computer program instructions, data, or both) which, when accessed, results in a machine (e.g., the processor(s) 887) performing the activities previously described herein.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which show by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A system, comprising:
    a memory; and
    a processor coupled to the memory and operable to execute instructions to:
        using a continuous integration daemon to continuously monitor the system for a build label to trigger the processor to build or merge source code including the following steps:
        retrieve a program from a centralized location within the system;
        identify build dependencies for the program;
        determine a latest build dependency from the identified build dependencies, including an applicable version of the latest build dependency;
        create a shell script to interface with a build tool;
        invoke the shell script to generate a source code build; and
        upon successful completion of the source code build change the label to indicate a built state.

2. The system of claim 1, the processor further operable to execute instructions upon detecting a label to merge code to merge code and generate a merge report that summarizes the files that were copied, deleted, added, and identified as a conflict.

3. The system of claim 2, the processor further operable to execute instructions to update a shared directory with the generated source code build.

4. The system of claim 2, the processor further operable to execute instructions to update a data store with the generated source code build, wherein the data store includes a directory updated each time there is a source code build.

5. The system of claim 2 further comprising generating a merge status in response to a conflict identification, wherein the merge status summarizes the component of the latest build dependency and the same component of a subsequent release.

6. The system of claim 1, the processor further operable to execute instructions to update the same component of a subsequent release in response to the component of the latest build dependency being updated.

* * * * *